United States Patent
Tseng et al.

(10) Patent No.: US 11,394,651 B1
(45) Date of Patent: Jul. 19, 2022

(54) SMART CACHE CONTROL FOR MISSION-CRITICAL AND HIGH PRIORITY TRAFFIC FLOWS

(71) Applicant: Nokia Solutions and Networks Oy, Espoo (FI)

(72) Inventors: Yu-Chia Tseng, Massy (FR); Bogdan Uscumlic, Les Ulis (FR); Gopalasingham Aravinthan, Nozay (FR); Bilal Al Jammal, Arcueil (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/165,362

(22) Filed: Feb. 2, 2021

(51) Int. Cl.
| | |
|---|---|
| *H04L 47/2441* | (2022.01) |
| *H04L 47/10* | (2022.01) |
| *H04L 47/2466* | (2022.01) |
| *H04L 47/2483* | (2022.01) |
| *H04L 45/00* | (2022.01) |
| *H04L 45/74* | (2022.01) |
| *H04W 28/02* | (2009.01) |
| *H04L 47/24* | (2022.01) |
| *H04L 67/5682* | (2022.01) |

(52) U.S. Cl.
CPC ......... *H04L 47/2441* (2013.01); *H04L 45/38* (2013.01); *H04L 45/54* (2013.01); *H04L 45/742* (2013.01); *H04L 47/24* (2013.01); *H04L 47/2466* (2013.01); *H04L 47/2483* (2013.01); *H04L 47/29* (2013.01); *H04L 67/2852* (2013.01); *H04W 28/02* (2013.01)

(58) Field of Classification Search
CPC . H04L 47/2441; H04L 47/29; H04L 47/2483; H04L 47/2466; H04L 45/38; H04L 45/54; H04L 45/742
See application file for complete search history.

(56) References Cited

U.S. PATENT DOCUMENTS 10,439,932 B2 * 10/2019 Chinthalapati ......... H04L 45/38
2013/0124707 A1 * 5/2013 Ananthapadmanabha ..................
H04L 47/2483
709/223

(Continued)

OTHER PUBLICATIONS

Pfaff, et al., "The Design and Implementation of Open vSwitch," USENIX Association (May 2015), pp. 116-130.

(Continued)

*Primary Examiner* — Arvin Eskandarnia
*Assistant Examiner* — Chhian (Amy) Ling
(74) *Attorney, Agent, or Firm* — Harness, Dickey & Pierce, P.L.C.

(57) ABSTRACT

A system, apparatus, method, and non-transitory computer readable medium for providing smart cache control for mission-critical and high-priority traffic flows may include a network device which is caused to, extract attributes from a network packet, determine whether to request a new flow rule from a network controller for the network packet based on the extracted attributes, transmit a new flow rule request to the network controller based on results of the determining, the new flow rule request including the extracted attributes, receive the new flow rule from the network controller in response to the new flow rule request, and store the new flow rule in at least one cache memory based on priority information of the new flow rule.

20 Claims, 4 Drawing Sheets

(56) References Cited

U.S. PATENT DOCUMENTS

| | | | |
|---|---|---|---|
| 2013/0170348 A1* | 7/2013 | Luna | H04W 28/0215 |
| | | | 370/230.1 |
| 2016/0373364 A1* | 12/2016 | Yokota | H04L 12/6418 |
| 2018/0083876 A1* | 3/2018 | Sharma | H04L 45/54 |

OTHER PUBLICATIONS

Pramanik, "Benchmarking of VPP," [Online].
Fd.io, "Honeycomb", https://wiki.fd.io/view/Honeycomb, retrieved on Feb. 17, 2021.
Open Virtual Network architecture, http://www.openvswitch.org/support/dist-docs/ovn-architecture.7.html, retrieved on May 28, 2021.
Gupta, et al., "Classifying Packets with Hierarchical Intelligent Cuttings," IEEE Micro Jan.-Feb. 2000, pp. 34-41.
Lee, et al., "Approaches for improving tuple space search-based table lookup," ICTC 2015, pp. 99-104.
Fan, et al., "Cuckoo filter: Practically better than bloom," CoNEXT'14, Dec. 2-5, 2014, Sydney, Australia.
Wang, et al., "Optimizing Open vSwitch to Support Millions of Flows", IEEE Explore, GlobalCom, 2017.
Song et al., "Fast Hash Table Lookup Using Extended Bloom Filter: An Aid to Network Processing", SIGCOMM'05, 2005.
Mendiola et al., "A Survey on the Contributions of Software-Defined Networking to Traffic Engineering", IEEE Communications Surveys & Tutorials, vol. 19, No. 2, Second Quarter 2017.
Network Working Group, "NetConf", https://www.rfc-editor.org/rfc/rfc4741.txt, Dec. 2006, retrieved on Feb. 18, 2021.
Internet Engineering Task Force (IETF), "Restconf Protocol", https://tools.ietf.org/html/rfc8040, Jan. 2017, retrieved on Feb. 18, 2021.
Open vSwitch Manual, ovs-dpctl(8), http://www.openvswitch.org/support/dist-docs/ovs-dpctl.8.txt, retrieved Feb. 18, 2021.
DigitalOcean, go-openvswitch, https://github.com/digitalocean/go-openvswitch, retrieved on Feb. 18, 2021.
Time-Sensitive Networking Task Group, https://www.ieee802.org/1/pages/tsn.html, retrieved on Feb. 18, 2021.
Nasrallah, et al., "Ultra-Low Latency (ULL) Networks: The IEEE TSN and IETF DetNet Standards and Related 5G ULL Research", IEEE Communications Surveys Tutorials 2019.
Kumar, et al., "Coupling Source Routing with Time-Sensitive Networking", IEEE Explore, IFIP 2020.
Nayak et al., "Routing algorithms for IEEE802.1Qbv networks," ACM SIGBED 2018.
Nayak et al., "Time-sensitive Software-defined Network (TSSDN) for Real-time Applications", Real-Time Networks and Systems (RTNS) 2016.
Craciunas et al., "Scheduling Real-Time Communication in IEEE 802.1Qbv Time Sensitive Networks," RTNS 2016.
Tootoonchian et al., "HyperFlow: A Distributed Control Plane for OpenFlow," INM/WREN 2010.
Koponen et al., "Onix: A distributed control platform for large-scale production networks," USENIX OSDI 2010.
Yeganeh et al., "Kandoo: A framework for efficient and scalable offloading of control applications," SIGCOMM HotSDN 2012.
Dixit et al., "Elasticon: An elastic distributed SDN controller," ANCS 2014.
Farrington et al., "Helios: a hybrid electrical/optical switch architecture for modular data centers," SIGCOMM 2010.
Bosshart et al., "Forwarding Metamorphosis: Fast Programmable Match-Action Processing in Hardware for SDN," SIGCOMM 2013.
Zhou et al., "A flexible and scalable high-performance OpenFlow switch on heterogeneous soc platforms," IPCCC2014.
Aighadhban et al., "Energy efficient SDN commodity switch based practical flow forwarding method", NOMS 2016.
Yu et al., "Scalable flow-based networking with DIFANE", SIGCOMM 2010.
Curtis et al., "DevoFlow: Scaling flow management for highperformance networks", SIGCOMM 2011.
Su et al., "CheetahFlow: Towards low latency software-defined network," ICC 2014.
Jarschel et al.. Modeling and Performance Evaluation of an OpenFlow Architecture, International Teletraffic Congress, 2011.
OpenFlow Switch Specification, Version 1.3.1, Open Networking Foundation, Sep. 6, 2012, https://www.opennetworking.org/wp-content/uploads/2013/04/openflow-spec-v1.3.1.pdf.
Juniper Networks, Inc., Junos OS OpenFlow User Guide, "Understanding OpenFlow Flow Entry Timers on Devices Running Junos OS", 2021, https://www.juniper.net/documentation/en_US/junos/topics/concept/junos-sdn-openflow-flow-entry-timers-overview.html.
AlGhadhban et al.. Delay Analysis of New-Flow Setup Time in Software Defined Networks, NOMS 2018.

* cited by examiner

SMART CACHE CONTROL FOR MISSION-CRITICAL AND HIGH PRIORITY TRAFFIC FLOWS

TECHNICAL FIELD

Various example embodiments relate to methods, apparatuses, systems, and/or non-transitory computer readable media for providing smart cache control for mission-critical and high priority traffic flows in a virtual switch (e.g., software switch) networking system.

BACKGROUND

Virtual switches are increasingly used in virtual machine (VM) contexts, where the virtual switches are installed with a VM hypervisor and control the processing and forwarding of network traffic to/from each of the VM instances supervised by the hypervisor.

SUMMARY

At least one example embodiment relates to a network device configured to operate a virtual network switch.

In at least one example embodiment, the network device may include at least one cache memory configured to store a first set of flow rules, and processing circuitry configured to execute computer readable instructions to cause the network device to, extract attributes from a network packet, determine whether to request a new flow rule from a network controller for the network packet based on the extracted attributes, transmit a new flow rule request to the network controller based on results of the determining, the new flow rule request including the extracted attributes, receive the new flow rule from the network controller in response to the new flow rule request, and store the new flow rule in the at least one cache memory based on priority information of the new flow rule.

Some example embodiments provide that the processing circuitry is further configured to execute the computer readable instructions to cause the network device to store the new flow rule in the at least one cache memory in response to the priority information of the new flow rule being higher than a desired priority threshold.

Some example embodiments provide that the processing circuitry is further configured to execute the computer readable instructions to cause the network device to store the new flow rule in a rules database stored on at least one storage device of the network device in response to the priority information of the new flow rule being lower than or equal to a desired priority threshold.

Some example embodiments provide that the network device may further include at least one storage device configured to store a rules database, the rules database configured to store a second set of flow rules, the at least one cache memory is included in kernel space of the virtual network switch, and the rules database is included in user space of the virtual network switch.

Some example embodiments provide that the processing circuitry is further configured to execute the computer readable instructions to cause the network device to, determine whether an applicable flow rule for the network packet is stored in the at least one cache memory based on the extracted attributes, and process the network packet based on the applicable flow rule.

Some example embodiments provide that the processing circuitry is further configured to execute the computer readable instructions to cause the network device to, determine whether an applicable flow rule for the network packet is stored in a rules database stored on at least one storage device of the network device, process the network packet based on the applicable flow rule, and copy the applicable flow rule to the at least one cache memory.

Some example embodiments provide that the new flow rule includes a desired persistency setting, and the processing circuitry is further configured to execute the computer readable instructions to cause the network device to store the new flow rule in the at least one cache memory for a desired time duration in accordance with the desired persistency setting.

Some example embodiments provide that the processing circuitry is further configured to execute the computer readable instructions to cause the network device to collect network statistics associated with the flow rules stored in the at least one cache memory and a rules database stored on at least one storage device of the network device, and transmit the network statistics to the network controller.

Some example embodiments provide that the processing circuitry is further configured to execute the computer readable instructions to cause the network device to receive configuration settings associated with the stored flow rules from the network controller in response to the transmitted network statistics, and update the stored flow rules based on the received configuration settings.

At least one example embodiment relates to a network controller.

In at least one example embodiment, the network controller may include a memory storing computer readable instructions, and processing circuitry configured to execute the computer readable instructions to cause the network controller to, receive a new rule request from at least one network device, the new rule request including packet information corresponding to a network packet received by the at least one network device, determine network priority information of the network packet based on the packet information, identify a new flow rule based on the determined network priority information, and transmit the new flow rule to the at least one network device.

Some example embodiments provide that the processing circuitry is further configured to execute the computer readable instructions to cause the network controller to transmit the new flow rule to a networking rules cache of the at least one networking device based on a network priority of the corresponding network packet being higher than a desired priority threshold.

Some example embodiments provide that the processing circuitry is further configured to execute the computer readable instructions to cause the network controller to transmit the new flow rule to a networking rules cache of at least one second networking device based on a network priority of the corresponding network packet being higher than a desired priority threshold.

Some example embodiments provide that the processing circuitry is further configured to execute the computer readable instructions to cause the network controller to transmit the new flow rule to a flow table of the at least one networking device in response to a network priority of the corresponding network packet being lower than or equal to a desired priority threshold.

Some example embodiments provide that the network controller is further caused to determine a desired persistency setting of the new flow rule based on the determined network priority information, and add the desired persistency setting to the new flow rule.

Some example embodiments provide that the processing circuitry is further configured to execute the computer readable instructions to cause the network controller to receive network statistics associated with flow rules stored on the at least one network device from the at least one network device, update configuration settings of the stored flow rules based on the received network statistics, and transmit the updated configuration settings to the at least one network device.

At least one example embodiment relates to a method of operating a virtual network switch.

In at least one example embodiment, the method may include extracting attributes from a network packet, determining whether to request a new flow rule from a network controller for the network packet based on the extracted attributes, transmitting a new flow rule request to the network controller based on results of the determining, the new flow rule request including the extracted attributes, receiving the new flow rule from the network controller in response to the new flow rule request, and storing the new flow rule in at least one cache memory associated with the virtual network switch based on priority information of the new flow rule.

Some example embodiments provide that the method may further include storing the new flow rule in the at least one cache memory in response to the priority information of the new flow rule being higher than a desired priority threshold.

Some example embodiments provide that the method may further include storing the new flow rule in a rules database of the virtual network switch in response to the priority information of the new flow rule being lower than or equal to a desired priority threshold.

Some example embodiments provide that the method may further include determining whether an applicable flow rule for the network packet is stored in the at least one cache memory based on the extracted attributes, and processing the network packet based on the applicable flow rule.

Some example embodiments provide that the method may further include determining whether an applicable flow rule for the network packet is stored in a rules database of the virtual network switch, processing the network packet based on the applicable flow rule, and copying the applicable flow rule to the at least one cache memory.

At least one example embodiment relates to a network device configured to operate a virtual network switch.

In at least one example embodiment, the network device may include means for storing a first set of flow rules in a cache memory, extracting attributes from the network packet, determining whether to request a new flow rule from a network controller for the network packet based on the extracted attributes, transmitting a new flow rule request to the network controller based on results of the determining, the new flow rule request including the extracted attributes, receiving the new flow rule from the network controller in response to the new flow rule request, and storing the new flow rule in the at least one cache memory based on priority information of the new flow rule.

Some example embodiments provide that the network device further includes means for performing the storing the new flow rule in the at least one cache memory in response to the priority information of the new flow rule being higher than a desired priority threshold.

Some example embodiments provide that the network device further includes means for performing the storing the new flow rule in a rules database included in at least one storage device of the network device, the rules database storing a second set of flow rules, in response to the priority information of the new flow rule being lower than or equal to a desired priority threshold.

Some example embodiments provide that the network device may further include means for storing a rules database in at least one storage device, the rules database storing a second set of flow rules, and further provide that the at least one cache memory is included in kernel space of the virtual network switch, and the rules database is included in user space of the virtual network switch.

Some example embodiments provide that the network device further includes means for determining whether an applicable flow rule for the network packet is stored in the at least one cache memory based on the extracted attributes, and processing the network packet based on the applicable flow rule.

Some example embodiments provide that the network device further includes means for determining whether an applicable flow rule for the network packet is stored in a rules database stored on at least one storage device of the network device, processing the network packet based on the applicable flow rule, and copying the applicable flow rule to the at least one cache memory.

Some example embodiments provide that the new flow rule includes a desired persistency setting, and the network device further includes means for storing the new flow rule in the at least one cache memory for a desired time duration in accordance with the desired persistency setting.

Some example embodiments provide that the network device further includes means for collecting network statistics associated with the flow rules stored in the at least one cache memory and a rules database stored on at least one storage device of the network device, and transmitting the network statistics to the network controller.

Some example embodiments provide that the network device further includes means for receiving configuration settings associated with the stored flow rules from the network controller in response to the transmitted network statistics, and updating the stored flow rules based on the received configuration settings.

At least one example embodiment relates to a network controller.

In at least one example embodiment, the network controller may include means for receiving a new rule request from at least one network device, the new rule request including packet information corresponding to a network packet received by the at least one network device, determining network priority information of the network packet based on the packet information, identifying a new flow rule based on the determined network priority information, and transmitting the new flow rule to the at least one network device.

Some example embodiments provide that the network controller further includes means for transmitting the new flow rule to a networking rules cache of the at least one networking device based on a network priority of the corresponding network packet being higher than a desired priority threshold.

Some example embodiments provide that the network controller further includes means for transmitting the new flow rule to a networking rules cache of at least one second networking device based on a network priority of the corresponding network packet being higher than a desired priority threshold.

Some example embodiments provide that the network controller further includes means for transmitting the new flow rule to a flow table of the at least one networking device in response to a network priority of the corresponding network packet being lower than or equal to a desired priority threshold.

Some example embodiments provide that the network controller further includes means for determining a desired persistency setting of the new flow rule based on the determined network priority information, and adding the desired persistency setting to the new flow rule.

Some example embodiments provide that the network controller further includes means for receiving network statistics associated with flow rules stored on the at least one network device from the at least one network device, updating configuration settings of the stored flow rules based on the received network statistics, and transmitting the updated configuration settings to the at least one network device.

BRIEF DESCRIPTION OF THE DRAWINGS

The accompanying drawings, which are incorporated in and constitute a part of the specification, illustrate one or more example embodiments and, together with the description, explain these example embodiments. In the drawings.

DETAILED DESCRIPTION

Figure 1:
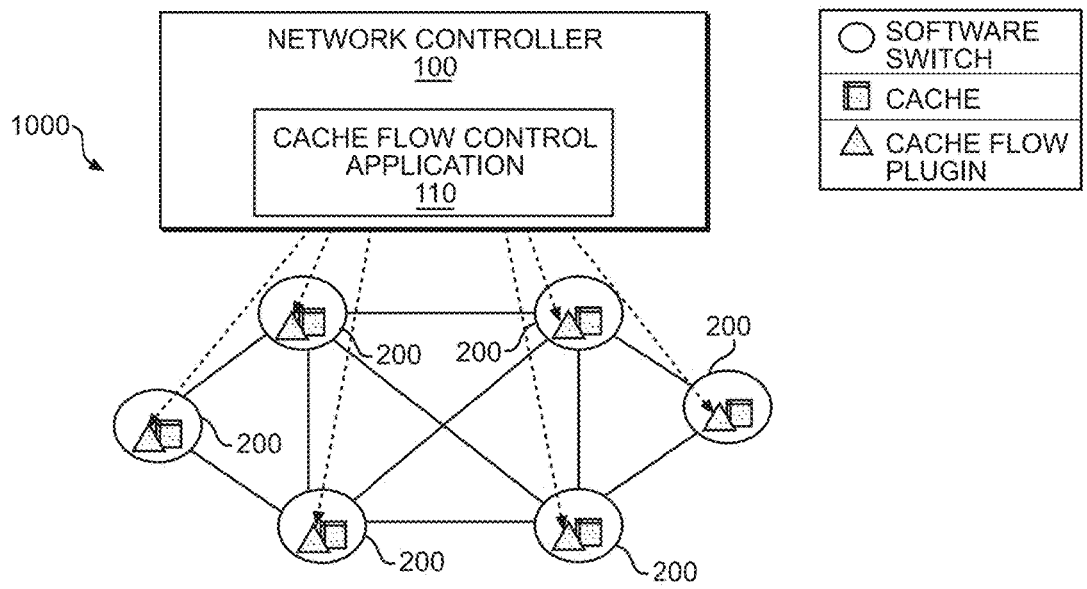
FIG. 1 illustrates a network communication system according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

While the various example embodiments of the present disclosure are discussed in connection with a fixed (e.g., wired network) for the sake of clarity and convenience, the example embodiments are not limited thereto, and one of ordinary skill in the art would recognize the example embodiments may be equally applicable to wireless communication standards, such as the 5G standard, 4G standard, a Wi-Fi standard, a future 6G standard, a future 7G standard, etc.

One or more of the example embodiments are directed towards a network device operating a virtual switch on a software defined network (SDN) and/or a network function virtualization (NFV)-enabled network. SDNs and NFV-enabled networks, such as 5G New Radio (NR) fixed and/or wireless networks, transport networks (e.g., front-haul, backhaul, mid-haul, etc.), data center networks, distributed networks, cloud networks, etc., are widely adopting virtual switches (e.g., software switches, virtual routers, etc.) to implement the processing and forwarding of network packets, including the caching of packet forwarding decisions (e.g., flow rules, network rules, packet forwarding rules, etc.) due to the flexibility of packet forwarding decision processing provided by virtual switches over hardware switches.

However, some virtual switch implementations, such as Open vSwitch (OVS) and Vector Packet Processing (VPP), are not suitable for fast processing of high priority and/or mission-critical network traffic, such as connected vehicles, robotics, industrial automation, control of nuclear reactors, etc., because these protocols do not provide for the prioritization of network traffic rules associated with high priority and/or mission-critical network packets. More specifically, the conventional virtual switch implementations do not provide support for priority based classification of high priority and/or mission-critical network packets. Therefore, packet forwarding rules associated with these high priority and/or mission-critical network packets may be removed from high speed cache memory of the virtual switches, thereby necessitating the virtual switch to perform higher latency and/or less efficient memory accesses, and/or even higher latency and less efficient network accesses to retrieve the forwarding rules associated with the high priority and/or mission-critical network packets. Accordingly, latency requirements and/or timing requirements for the high priority and/or mission-critical network packets may be violated when using conventional virtual switch implementations.

FIG. 1 illustrates a network communication system 1000 according to at least one example embodiment. As shown in FIG. 1, a network communication system 1000 includes at least one network controller 100 and at least one network device implementing a software switch 200 interconnected over a wired and/or wireless network, but the example embodiments are not limited thereto and the example embodiments may include a greater or lesser number of constituent elements. According to some example embodiments, a wired network may include the Internet, an intranet, a wide area network, etc., but is not limited thereto. According to some example embodiments, a wireless network may include a cellular wireless access network (e.g., a 3G wireless access network, a 4G-Long Term Evolution (LTE) network, a 5G-New Radio (e.g., 5G) wireless network, etc.), a WiFi network, etc., but is not limited thereto.

Generally, a network device 200 (also referred to as the virtual switch device, etc.) is a computing device, such as a server, a computer, a hardware-implemented switch or router, etc., executing virtual switch software, such as Open vSwitch (OVS), Vector Packet Processing (VPP), etc. For example, the network device 200 may be a cloud server configured to operate a virtual machine (VM) hypervisor and the virtual switch, but the example embodiments are not limited thereto. The network device 200 may receive incoming network traffic (e.g., incoming network packets, etc.) from the network 1000, e.g., from an external network device 200, the network controller 100, and/or at least one internal application executing on the network device 200, such as one or more applications being executed in an VM instance supervised by a VM hypervisor, etc., but the example embodiments are not limited thereto. The network device 200 may process the incoming network traffic based on network flow rules (e.g., flow rules, packet rules, forwarding rules, etc.) stored in the memory of the network device 200. Additionally, if a network flow rule corresponding to the received network packet is not found in the memory of the network device 200, the network device 200 may transmit a request for new network flow rules to the network controller 100. The network controller 100 may then look up, identify, determine, and/or generate a new flow rule for the received network traffic and transmit the new flow rule to the requesting network device 200. Additionally, according to some example embodiments, the network controller 100 may also transmit the new flow rule to other network devices in the network 1000 that are within the traffic/network path of the received network traffic. The traffic/network path refers to a route between a host and the destination for one or more data packets in the network and/or a part of the network controlled by the network controller 100), etc., and the traffic path for individual network packets may be determined by the network controller 100 based on information received from the centralized control plane (CCP), etc., but the example embodiments are not limited thereto. The requesting network device 200 then stores the new flow rule in long term flow rule storage (e.g., a flow rule database, etc.) or short term flow rule storage (e.g., a flow rule cache, etc.) and then processes the received network traffic based on the new flow rule from the network controller 100, etc., but the example embodiments are not limited thereto. The network controller 100 and the network device 200 will be discussed in greater detail in connection with FIGS. 2 to 5.

Additionally, the network communication system may include a plurality of network devices, a single network device, a plurality of network controllers, at least one radio access network (RAN) node, at least one base station, etc. Additionally, according to some example embodiments, at least one user equipment (UE) device may be connected to at least one network device 200 and/or the network controller 100 over a wired and/or wireless network. For example, the UE device may include a mobile device, a smartphone, a tablet, a laptop computer, a wearable device, an Internet of Things (IoT) device, a sensor (e.g., thermometers, humidity sensors, pressure sensors, motion sensors, accelerometers, etc.), actuators, robotic devices, robotics, drones, connected medical devices, eHealth devices, smart city related devices, a security camera, autonomous devices (e.g., autonomous cars, etc.), a desktop computer, a server, and/or any other type of stationary or portable device capable of connecting to a wired and/or wireless network.

Additionally, according to some example embodiments, the network communication system may further include at least one core network element (not shown) residing on the network, such as a core network device, a core network server, access points, switches, routers, nodes, etc., but the example embodiments are not limited thereto. The network may provide network functions, such as an access and mobility management function (AMF), a session management function (SMF), a policy control function (PCF), a unified data management (UDM), a user plane function (UPF), an authentication server function (AUSF), an application function (AF), and/or a network slice selection function (NSSF), etc., associated with a 5G network, but the example embodiments are not limited thereto.

While certain components of a communication network are shown as part of the communication system of FIG. 1, the example embodiments are not limited thereto, and the communication network may include components other than that shown in FIG. 1, which are desired, necessary, and/or beneficial for operation of the network, such as access points, switches, routers, nodes, servers, gateways, etc.

Figure 2:
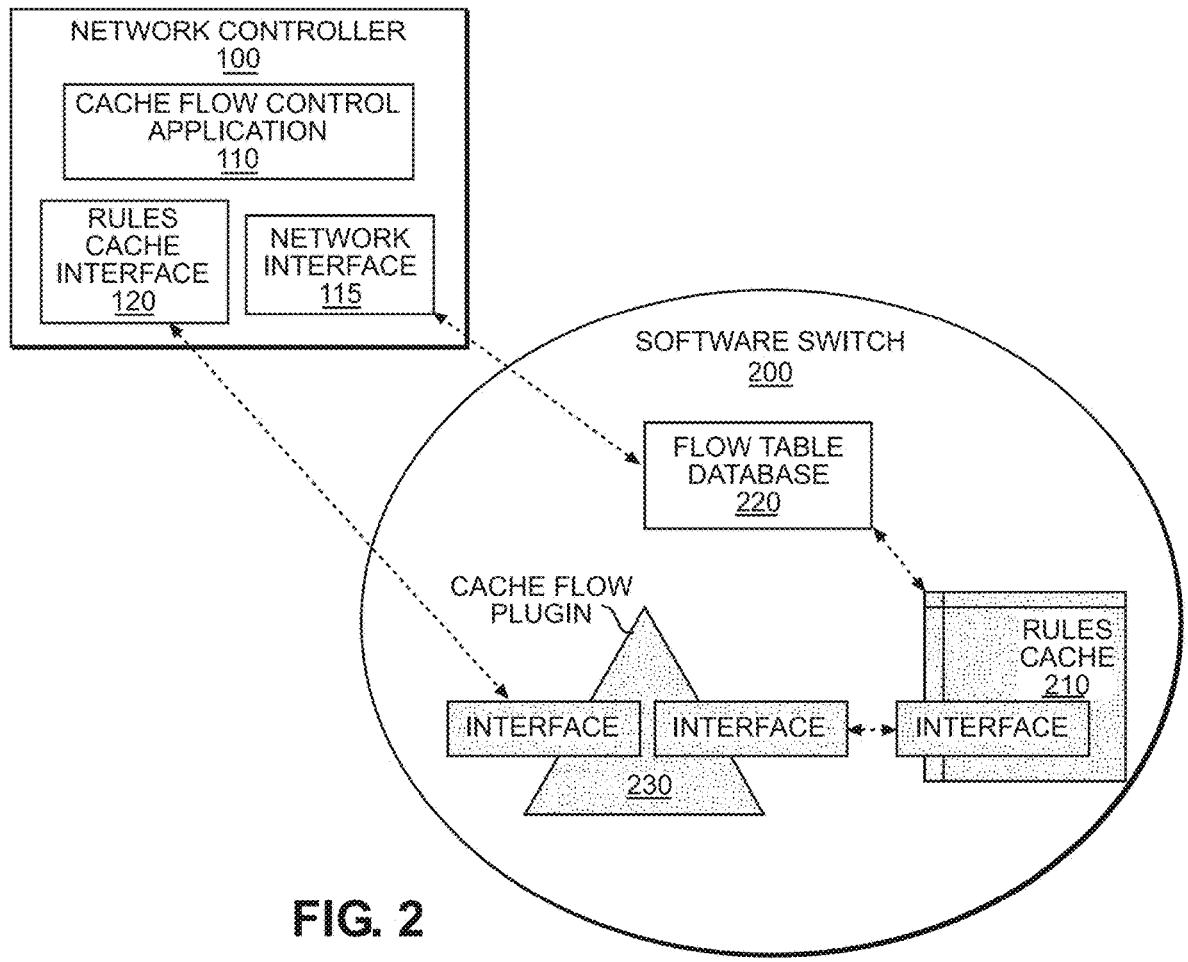
FIG. 2 illustrates an example functional block diagram of a virtual network switch of FIG. 1.

FIG. 2 illustrates an example functional block diagram of a implementing a virtual network switch device according to at least one example embodiment. The virtual network switch device of FIG. 2 may correspond to one or more of the network devices 200 of FIG. 1, but is not limited thereto.

Referring to FIG. 2, a virtual switch network device 200 includes a rules cache 210, a flow table 220, and/or a cache flow plugin 230, etc., but the example embodiments are not limited thereto, and the virtual switch network device 200 may include a greater or lesser number of constituent elements. Additionally, a network controller 100 includes a cache flow control application 110, a network interface 115, and/or a rules cache interface 120, but the example embodiments are not limited thereto, and the network controller 100 may include a greater or lesser number of constituent elements.

As discussed in connection with FIG. 1, the virtual switch network device 200 may receive an incoming network packet (e.g., data packet, etc.) (not shown). The virtual switch network device 200 may process the incoming network packet by extracting packet attributes from the incoming network packet and comparing the extracted packet attributes with flow rules stored in the rules cache 210. According to some example embodiments, the rules cache 210 may be hardware cache memory, e.g., a CPU cache, cache associated with a processor core, RAM of the virtual switch network device 200, etc., but the example embodiments are not limited thereto, and may provide memory accesses that are orders of magnitude faster than memory accesses to a storage device. Additionally, the rules cache 210 may be executed within the kernel-space of the virtual switch software and the number of flow rules capable of being stored in the rules cache 210 may be limited based on the cache memory size of the network device 200, and for example, may be limited to 200K entries, etc., but are not limited thereto. Due to the limited size of the cache memory of the virtual switch network device 200, the rules stored in the rules cache 210 may be replaced in accordance with a cache replacement policy algorithm (e.g., the virtual switch network device 200 may perform a cache replacement operation), such as a least recently used (LRU) replacement policy, first in, first out (FIFO) policy, last in, first out (LIFO) policy, most recently used (MRU) policy, random replacement (RR) policy, least frequently used (LFU) policy, etc., but the example embodiments are not limited thereto. According to some example embodiments, the flow rules stored in the rules cache 210 may include priority information that may be examined during a cache replacement operation. For example, flow rules associated with high priority and/or mission-critical network packets may be designated as having high priority (e.g., a high priority level, etc.). Based on the priority level of the flow rule, the virtual switch network device 200 may exempt the flow rule from being replaced during the cache replacement operation and/or only replace the flow rule if a new flow rule of equal or greater priority is being added to the rules cache 210, etc.

Additionally, all of the rules stored in the rules cache 210 may be replaced, deleted, discarded and/or flushed in response to a command received from the virtual switch 200 and/or the network controller 100, and/or based on a designated desired persistency setting and/or "time-out" setting, wherein rules that have been stored in the rules cache 210 for a desired time period and/or time-out time period (e.g., X number of minutes, hours, days, etc.) are removed from the rules cache 210, but the example embodiments are not limited thereto. Based on the priority level of the flow rule, the flow rule may be exempt from the desired persistency setting and/or the cache flush command, etc. According to some example embodiments, the network controller 100 may set the persistency setting of the flow rule based on the priority information of the flow rule. For example, the network controller 100 may set the persistency setting of a flow rule to be indefinite for high priority flow rules, and set to a first desired time period for flow rules that are not high priority, etc., but the example embodiments are not limited thereto, and the persistency settings may be set to any desired value.

Additionally, if an applicable flow rule is not found in the rules cache 210 (e.g., a cache miss), the virtual switch network device 200 may copy the extracted packet attributes (e.g., extracted packet header information, etc.) to user space of the virtual switch software and compare the extracted packet attributes to a flow table database 220. The flow table database 220 may be stored in a storage device of the virtual switch network device 200 (e.g., a hard drive, solid state drive, etc.) and may store flow rules for a longer period of time than the rules cache 210 and/or store the flow rules for an indefinite period of time due to the greater storage capacity of the storage device. However, because the flow table database 220 resides in user space of the virtual switch software and not kernel space, and because the storage device naturally has longer memory access times than the cache memory, use of the flow table database 220 incurs significant time penalties in comparison to use of the rules cache 210. For example, when comparing the throughput performance of the rules cache 210 and the flow table database 220, some studies have shown that the throughput increases from approximately 37 kilo-transactions/second (ktps) to between approximately 56 ktps and 120 ktps (based on configuration settings) and the CPU usage may decrease up to approximately 29%, when a flow rule is found in the rules cache 210 instead of the flow table database 220, but the example embodiments are not limited thereto. In the event that an applicable flow rule is not found in the flow table 220, the virtual switch network device 200 transmits a request for a new flow rule corresponding to the network packet over a network (e.g., over network 1000) to the network controller 100 using a network flow message protocol, such as OpenFlow, OVSDB Management Protocol, NetConf, RestConf, etc. The transmitted request may include the extracted attributes of the received network packet, etc.

According to some example embodiments, the network controller 100 executes a cache flow control application 110, but is not limited thereto. The cache flow control application 110 may further include a persistent flow rules database (not shown) storing flow rules for the entire network 1000. Additionally, the persistent flow rules database may be configured to store the flow rules for the network 1000 indefinitely, e.g., the flow rules are not deleted and/or discarded from the persistent flow rules database unless the flow rule has been actively deleted by an administrator and/or the network controller, etc. The cache flow control application 110 may compare the attributes (e.g., packet header information) included in the network request with the stored flow rules and determine the applicable flow rule to the extracted attributes and/or the network packet.

Additionally, the network controller 100 may look up priority information associated with the network packet and/or the flow rule applicable to the network packet to determine whether the flow rule is a high priority and/or mission-critical flow rule (e.g., the network packet is associated with a high priority and/or mission-critical network service and/or network application, etc.). For example, a network administrator and/or operator may designate certain network packets and/or network packets related to certain applications, services, network sources, and/or network destinations, etc., as having high priority and/or mission-critical status, in the network controller and/or flow rule settings, and set the priority information values for these network packets accordingly. For example, network packets related to network-connected vehicles, robotics, industrial automation, control of nuclear reactors, emergency services, etc., may be designated and/or considered to be high priority and/or mission-critical network services and/or applications, but the example embodiments are not limited thereto. According to some example embodiments, the network controller 100 may automatically identify a network packet as being a high priority and/or mission-critical packet by comparing stored network settings and/or administrator settings with extracted attributes from the network packet (e.g., extracted packet header information, such as source information (e.g., src field), destination information (e.g., dst field), quality of service (QoS) information (e.g., type of service (ToS) field for IPv4, traffic class field for IPv6), port number, etc.), but the example embodiments are not limited thereto.

In the event that the new flow rule (e.g., the flow rule applicable to the network packet) is a high priority and/or mission-critical flow rule (e.g., the priority information associated with and/or corresponding to the new flow rule indicates that the new flow rule is a priority flow rule), the network controller 100 uses the rules cache interface 120 to inject the new flow rule, including priority information associated with the new flow rule, directly into the rules cache 210 of the virtual switch network device 200 via the cache flow plugin 230, but the example embodiments are not limited thereto. According to some example embodiments, the cache flow plugin 230 provides communication and control transmission directly between the network controller 100 and the kernel space (where the rules cache 210 resides) of the virtual switch network device 200, thereby avoiding the user space of the virtual switch network device 200, etc.

In the event that the network controller 100 determines that the new flow rule is not a high priority and/or mission-critical flow rule, the network controller 100 transmits the new flow rule (including the priority information associated with the new flow rule) over the network interface 115 (e.g., a conventional network interface, etc.) to user space of the virtual switch network device 200 via the network flow message protocol using the network 1000, however the example embodiments are not limited thereto. For example, according to some example embodiments, the rules cache interface 120 and the network interface 115 may be combined into a single network interface and/or may be further subdivided into a plurality of interfaces, etc. The virtual switch network device 200 then stores the new flow rule in the flow table database 220.

Figure 3:
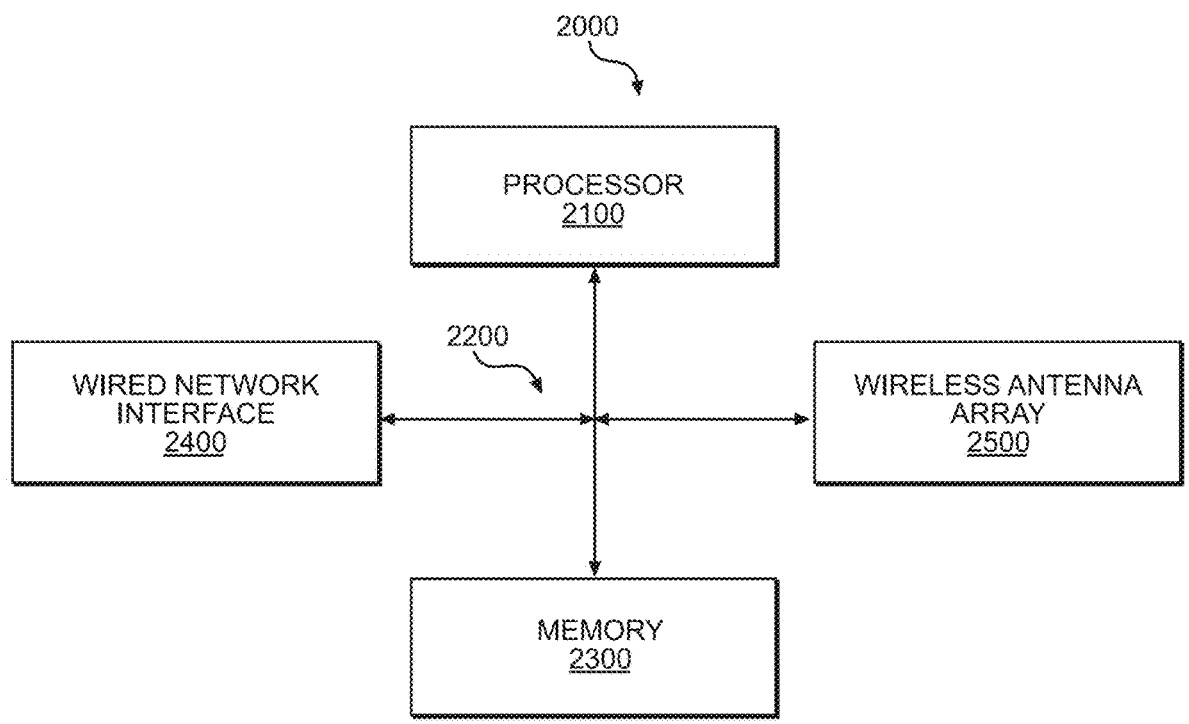
FIG. 3 illustrates a block diagram of a network device according to at least one example embodiment.

FIG. 3 illustrates a block diagram of a network device according to at least one example embodiment. The network device may correspond to the virtual network switch device of FIG. 2 and/or network controller of FIG. 2, but the example embodiments are not limited thereto.

Referring to FIG. 3, a network device 2000 may include processing circuitry, such as at least one processor 2100, at least one communication bus 2200, a memory 2300, at least one wired network interface 2400, and/or at least one wireless antenna array 2500, but the example embodiments are not limited thereto. For example, the wired network interface 2400 and the wireless antenna array 2500 may be combined into a single network interface, etc., or the network device 2000 may include a plurality of wireless antenna arrays, a plurality of wired network interfaces, etc., and/or any combinations thereof. The memory 2300 may include various special purpose program code including computer executable instructions which may cause the network device 2000 to perform the one or more of the methods of the example embodiments.

In at least one example embodiment, the processing circuitry may include at least one processor (and/or processor cores, distributed processors, networked processors, etc.), such as the at least one processor 2100, which may be configured to control one or more elements of the network device 2000, and thereby cause the network device 2000 to perform various operations. The processing circuitry (e.g., the at least one processor 2100, etc.) is configured to execute processes by retrieving program code (e.g., computer readable instructions) and data from the memory 2300 to process them, thereby executing special purpose control and functions of the entire network device 2000. Once the special purpose program instructions are loaded into, (e.g., the at least one processor 2100, etc.), the at least one processor 2100 executes the special purpose program instructions, thereby transforming the at least one processor 2100 into a special purpose processor. Additionally, according to some example embodiments, the processing circuitry further includes at least one cache memory accessible by the at least one processor 2100, etc.

In at least one example embodiment, the memory 2300 may be a non-transitory computer-readable storage medium and may include a random access memory (RAM), a read only memory (ROM), and/or a permanent mass storage device such as a disk drive, or a solid state drive. Stored in the memory 2300 is program code (i.e., computer readable instructions) related to operating the network device 2000, such as the methods discussed in connection with FIGS. 4 to 5 (e.g., computer readable instructions associated with the network controller 100, the virtual switch network device 200, the virtual switch software, a hypervisor and/or virtual machine, etc.), the at least one wired network interface 2400, and/or at least one wireless antenna array 2500, etc. Such software elements may be loaded from a non-transitory computer-readable storage medium independent of the memory 2300, using a drive mechanism (not shown) connected to the network device 2000, or via the at least one wired network interface 2400, and/or at least one wireless antenna array 2500, etc.

In at least one example embodiment, the communication bus 2200 may enable communication and data transmission to be performed between elements of the network device 2000. The bus 2200 may be implemented using a high-speed serial bus, a parallel bus, and/or any other appropriate communication technology. According to at least one example embodiment, the network device 2000 may include a plurality of communication buses (not shown), such as an address bus, a data bus, etc.

The network device 2000 may operate as, for example, a cloud networking server, a VM server, a data server, a 4G RAN node, a 5G RAN node, etc.

The network device 2000 may also include at least one wired network interface 2400, and/or at least one wireless antenna array 2500, etc. The at least one wired network interface 2400 may include at least one receiver and/or transmitter (e.g., transceiver) unit capable of receiving and/or transmitting data over a wired networking technology, such as Ethernet, etc. The at least one wireless antenna array 2500 may include an associated array of radio units (not shown) and may be used to transmit the wireless signals in accordance with a radio access technology, such as 4G LTE wireless signals, 5G NR wireless signals, etc., to at least one UE device, a Data Network, etc. According to some example embodiments, the wireless antenna array 2500 may be a single antenna, or may be a plurality of antennas, etc. For example, the wireless antenna array 2500 may be configured as a grid of beams (GoB) which transmits a plurality of beams in different directions, angles, frequencies, and/or with different delays, etc., but the example embodiments are not limited thereto.

The network device 2000 may communicate with a core network (e.g., backend network, backhaul network, backbone network, Data Network, etc.) of a communication network (e.g., network 1000) via the wired network interface 2400 and/or wireless antenna array 2500. The wired network interface 2400 and/or wireless antenna array 2500 may enable the network device 2000 to communicate and/or transmit data to and from to network devices on the backend network, such as a core network gateway (not shown), a Data Network, such as the Internet, intranets, wide area networks, telephone networks, VoIP networks, etc.

While FIG. 3 depicts an example embodiment of a network device 2000 applicable to either a network controller and/or a virtual network switch device, the network controller and/or virtual network switch device are not limited thereto, and may include additional and/or alternative architectures that may be suitable for the purposes demonstrated.

Figure 4:
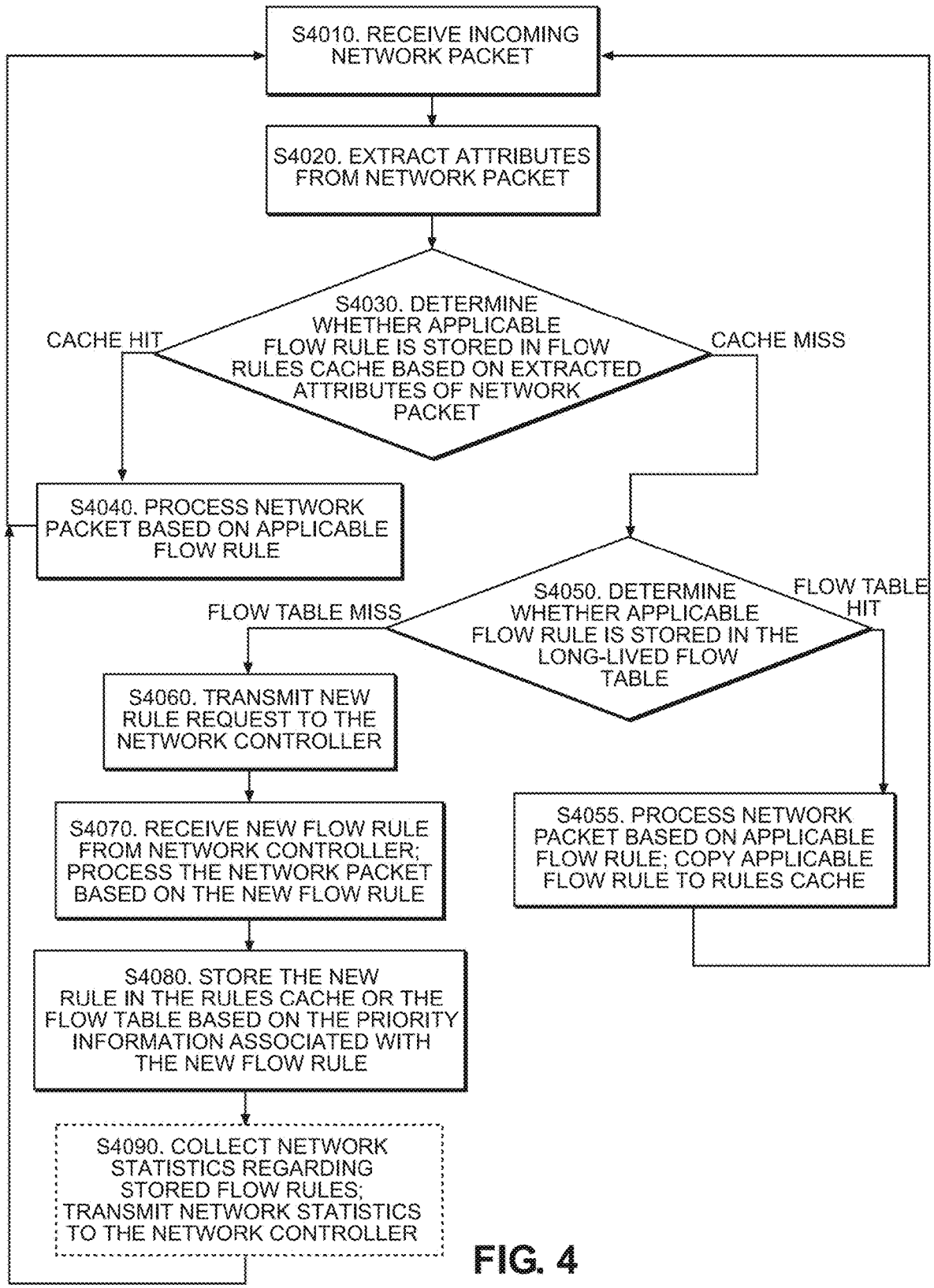
FIG. 4 is a flowchart illustrating a method of operating a virtual network switch according to at least one example embodiment.

FIG. 4 is a flowchart illustrating a method of operating a virtual network switch according to at least one example embodiment.

According to some example embodiments, in operation S4010, the virtual switch network device may receive an incoming network packet from the network, and/or the virtual switch network device may receive a packet generated by a service and/or application running on a VM instance of the virtual switch network device, but the example embodiments are not limited thereto. In operation S4020, the virtual switch network device may extract attributes from the network packet, such as extracting the packet header (e.g., header information), or portions of the packet header, etc., but the example embodiments are not limited thereto. In operation S4030, the virtual switch network device may compare the extracted packet attributes to flow rules stored in a rules cache associated with the virtual switch network device. The rules cache may be a hardware cache (e.g., a CPU cache, etc.) of the virtual switch network device, but the example embodiments are not limited thereto. For example, the virtual switch network device may perform an "exact match" comparison of the extracted attributes to packet attributes included in the flow rules stored in the rules cache, or in other words, determine if there is a flow rule that contains attributes which are an exact match to the extracted attributes from the received network packet, and/or may compare a hash of the extracted attributes from the received network packet to a hash of attributes included in each of the flow rules stored in the rules cache, etc., but the example embodiments are not limited thereto.

If an applicable rule is found in the rules cache (e.g., there is a cache hit), the virtual switch network device proceeds to operation S4040 and processes (e.g., forwards) the network packet in accordance with and/or based on the applicable flow rule (e.g., forwards the network packet to the destination specified in the applicable flow rule, etc.).

However, if an applicable rule is not found in the rules cache, the virtual switch network device proceeds to operation S4050, and copies the extracted attributes to the user space of the virtual switch software and compares the extracted attributes to the flow rules stored in the flow table database. If an applicable rule is found in the flow table database, the virtual switch network device proceeds to operation S4055 and processes (e.g., forwards) the network packet in accordance with and/or based on the applicable flow rule. Additionally, the virtual switch network device copies the applicable flow rule to the rules cache. In some example embodiments, if the rules cache is full, the applicable flow rule may replace a previously stored flow rule in the rules cache according to a cache replacement policy for the rules cache, such as a LRU policy, etc.

In the event of a flow table miss, in operation S4060, the virtual switch network device transmits a request (e.g., a new flow rule request, etc.) to a network controller. According to some example embodiments, the request includes the previously extracted attributes of the received network packet. In response to the new flow rule request, the network controller may perform a lookup in a persistent flow rules database for a flow rule associated with the network packet based on the packet attributes included in the flow rule request, and transmits the new flow rule to the virtual switch network device. The operations of the network controller will be discussed in further detail in FIG. 5. In operation S4070, the virtual switch network device receives a new flow rule from the network controller. The virtual switch network device may then process the received network packet based on the received new flow rule applicable to the received network packet. Additionally, in operation S4080, the virtual switch network device may store the new flow rule in the rules cache or the flow table database based on the determined priority information associated with the new flow rule. For example, if the priority information associated with the new flow rule is higher than a desired priority threshold, the virtual switch network device may store the new flow rule in the rules cache. If the priority information associated with the new flow rule is less than or equal to the desired priority threshold, the virtual switch network device may store the new flow rule in the flow table database, etc.

Additionally, in some example embodiments, the network controller may directly inject the new flow rule into the rules cache, or in other words, the virtual switch network device may receive the new flow rule via a cache flow plugin interface, in response to the priority information of the new flow rule being higher than a desired priority threshold (or in other words, the new flow rule has a high priority and/or is mission critical. Additionally, according to some example embodiments, the network controller may directly inject the new flow rule to the rules cache(s) of one or more other virtual switch network devices (e.g., at least one second virtual switch network device, virtual switch network devices that did not request the new flow rule, etc.) residing on the network in response to the priority information of the new flow rule being greater than the desired priority threshold, etc., but the example embodiments are not limited thereto.

In some example embodiments, the network controller may transmit the new flow rule to the virtual switch network device via a standard flow networking message for storage in the flow table database in response to the priority information of the new flow rule being lower than or equal to the desired priority threshold, thereby indicating the new flow rule does not have a high priority and/or is not mission critical. Additionally, according to some example embodiments, the network controller may transmit the new flow rule to one or more other virtual switch network devices (e.g., at least one second virtual switch network device, virtual switch network devices that did not request the new flow rule, etc.) residing on the network as well for storage in their respective flow table databases in response to the priority information of the new flow rule being lower than or equal to the desired priority threshold, etc., but the example embodiments are not limited thereto.

According to some example embodiments, operations S4070 and S4080 may be performed concurrently.

In optional operation S4090, the virtual switch network device may collect network statistics and/or cache statistics, such as number of active entries, packet lookup matches, per flow received packets, duration (seconds), number of received packets, number of transmitted packets, number of transmitted bytes, number of transmit drops, number of receive errors, number of transmit errors, number of receive frames, per queue transmit packets, etc., or any combinations thereof, regarding the stored flow rules, but is not limited thereto. For example, the virtual switch network device may collect statistics regarding the frequency of types of network packets, network traffic patterns, etc., cache hit/cache miss information, number of times a flow rule has been used, etc. The virtual switch network device may then transmit the collected network statistics to the network controller. The network controller may update and/or modify configuration settings for one or more flow rules stored in the persistent flow rules database based on the collected network statistics, and transmit configuration settings to the virtual switch network device which cause the virtual switch network device to update and/or modify the flow rules, etc. In at least one example embodiment, the network controller may transmit a flow rule replacement instruction to virtual switch network device and include the updated and/or modified flow rules, thereby causing the virtual switch network device to replace the previous version of the flow rule with the updated and/or modified flow rule.

Figure 5:
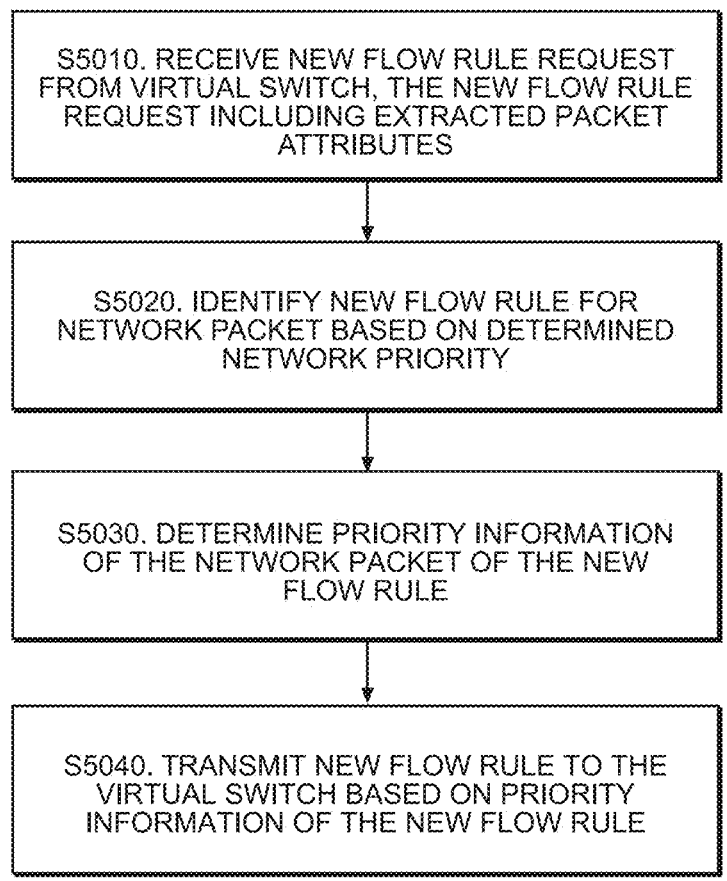
FIG. 5 is a flowchart illustrating a method of operating a network controller according to at least one example embodiment.

FIG. 5 is a flowchart illustrating a method of operating a network controller according to at least one example embodiment.

According to some example embodiments, in operation S5010, a network controller may receive a new flow rule request from a virtual switch network device. The new flow rule request may include packet attributes (e.g., a packet header, etc.) extracted from and/or associated with a packet received by the virtual switch network device. In operation S5020, the network controller may perform a lookup in a persistent flow rules database for a flow rule associated with the network packet based on the packet attributes included in the flow rule request from the virtual switch network device. In the event that the persistent flow rules database does not store a flow rule associated with the network packet, the network controller, a network administrator, and/or network operator may generate a new flow rule associated with the network packet using known methods. In operation S5030, the network controller may determine priority information associated with the network packet based on the identified and/or generated flow rule associated with the network packet. More specifically, the flow rule entry associated with the network packet may include the priority information associated with the network packet, but the example embodiments are not limited thereto. In response to the priority information of the flow rule indicates the flow rule is high priority and/or mission critical (e.g., the priority information associated with the flow rule/network packet is greater than a desired priority threshold, etc.), the network controller may directly transmit and/or inject the new flow rule into the rules cache of the virtual switch network device via a cache flow interface. In response to the priority information of the flow rule indicating the flow rule is not a high priority and/or mission critical (e.g., the priority information associated with the flow rule/network packet is less than or equal to the desired priority threshold, etc.), the network controller may transmit the new flow rule to the virtual switch network device via a responsive flow message. The virtual switch network device may then store the new flow rule in its flow table database.

Various example embodiments are directed towards a virtual switch implementing prioritization of high priority and/or mission critical network packets via priority storage of associated flow rules in a cache memory of the virtual switch. Accordingly, one or more of the example embodiments provide methods for improving the cache hit frequency of high priority and/or mission critical flow rules within the virtual switch, thereby improving the speed and efficiency of the processing and/or forwarding of high priority and/or mission critical network packets.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A network device configured to operate a virtual network switch, the network device comprising:
    at least one cache memory configured to store a first set of flow rules;
    at least one storage device configured to store a rules database, the rules database configured to store a second set of flow rules; and
    processing circuitry configured to execute computer readable instructions to cause the network device to,
        extract attributes from a network packet,
        determine whether to request a new flow rule from a network controller for the network packet based on the extracted attributes,
        transmit a new flow rule request to the network controller based on results of the determining, the new flow rule request including the extracted attributes,
        receive the new flow rule from the network controller in response to the new flow rule request,
        process the network packet using the new flow rule, and
        store the new flow rule in either the at least one cache memory or the rules database based on priority information of the new flow rule.

2. The network device of claim 1, wherein the processing circuitry is further configured to execute the computer readable instructions to cause the network device to store the new flow rule in the at least one cache memory in response to the priority information of the new flow rule being higher than a desired priority threshold.

3. The network device of claim 1, wherein the processing circuitry is further configured to execute the computer readable instructions to cause the network device to store the new flow rule in the rules database in response to the priority information of the new flow rule being lower than or equal to a desired priority threshold.

4. The network device of claim 1, further comprising:
    the at least one cache memory is included in kernel space of the virtual network switch; and
    the rules database is included in user space of the virtual network switch.

5. The network device of claim 1, wherein the processing circuitry is further configured to execute the computer readable instructions to cause the network device to:
    determine whether an applicable flow rule for the network packet is stored in the at least one cache memory based on the extracted attributes; and
    process the network packet based on the applicable flow rule.

6. The network device of claim 1, wherein the processing circuitry is further configured to execute the computer readable instructions to cause the network device to:
    determine whether an applicable flow rule for the network packet is stored in a rules database stored on at least one storage device of the network device;
    process the network packet based on the applicable flow rule; and
    copy the applicable flow rule to the at least one cache memory.

7. The network device of claim 1, wherein
    the new flow rule includes a desired persistency setting; and
    the processing circuitry is further configured to execute the computer readable instructions to cause the network device to:
        store the new flow rule in the at least one cache memory for a desired time duration in accordance with the desired persistency setting.

8. The network device of claim 1, wherein the processing circuitry is further configured to execute the computer readable instructions to cause the network device to:
    collect network statistics associated with the flow rules stored in the at least one cache memory and a rules database stored on at least one storage device of the network device; and
    transmit the network statistics to the network controller.

9. The network device of claim 8, wherein the processing circuitry is further configured to execute the computer readable instructions to cause the network device to:
    receive configuration settings associated with the stored flow rules from the network controller in response to the transmitted network statistics; and
    update the stored flow rules based on the received configuration settings.

10. A network controller comprising:
    a memory storing computer readable instructions; and
    processing circuitry configured to execute the computer readable instructions to cause the network controller to,
        receive a new rule request from at least one network device, the new rule request including packet information corresponding to a network packet received by the at least one network device,
        determine network priority information of the network packet based on the packet information,
        identify a new flow rule based on the determined network priority information,
        determine whether to transmit the new flow rule to one of a network rules cache of the at least one network device or a flow table of the at least one networking device based on the determined network priority information, and
        transmit the new flow rule to the at least one network device.

11. The network controller of claim 10, wherein the processing circuitry is further configured to execute the computer readable instructions to cause the network controller to:
    transmit the new flow rule to the networking rules cache of the at least one networking device based on a network priority of the corresponding network packet being higher than a desired priority threshold.

12. The network controller of claim 10, wherein the processing circuitry is further configured to execute the computer readable instructions to cause the network controller to:

transmit the new flow rule to a networking rules cache of at least one second networking device based on a network priority of the corresponding network packet being higher than a desired priority threshold.

13. The network controller of claim 10, wherein the processing circuitry is further configured to execute the computer readable instructions to cause the network controller to:

transmit the new flow rule to the flow table of the at least one networking device in response to a network priority of the corresponding network packet being lower than or equal to a desired priority threshold.

14. The network controller of claim 10, wherein the processing circuitry is further configured to execute the computer readable instructions to cause the network controller to:

determine a desired persistency setting of the new flow rule based on the determined network priority information; and add the desired persistency setting to the new flow rule.

15. The network controller of claim 10, wherein the processing circuitry is further configured to execute the computer readable instructions to cause the network controller to:

receive network statistics associated with flow rules stored on the at least one network device from the at least one network device;

update configuration settings of the stored flow rules based on the received network statistics; and transmit the updated configuration settings to the at least one network device.

16. A method of operating a virtual network switch comprising:

extracting attributes from a network packet;

determining whether to request a new flow rule from a network controller for the network packet based on the extracted attributes;

transmitting a new flow rule request to the network controller based on results of the determining, the new flow rule request including the extracted attributes;

receiving the new flow rule from the network controller in response to the new flow rule request;

processing the network packet using the new flow rule; and storing the new flow rule in either at least one cache memory associated with the virtual network switch or at least one rules database included on at least one storage device of the virtual network switch based on priority information of the new flow rule.

17. The method of claim 16, further comprising:

storing the new flow rule in the at least one cache memory in response to the priority information of the new flow rule being higher than a desired priority threshold.

18. The method of claim 16, further comprising:

storing the new flow rule in the rules database of the virtual network switch in response to the priority information of the new flow rule being lower than or equal to a desired priority threshold.

19. The method of claim 16, further comprising:

determining whether an applicable flow rule for the network packet is stored in the at least one cache memory based on the extracted attributes; and processing the network packet based on the applicable flow rule.

20. The method of claim 16, further comprising:

determining whether an applicable flow rule for the network packet is stored in the rules database of the virtual network switch;

processing the network packet based on the applicable flow rule; and copying the applicable flow rule to the at least one cache memory.

* * * * *